Nov. 21, 1961     M. BRENNER     3,009,987

CONNECTOR

Filed June 23, 1959

INVENTOR.
Morris Brenner
BY Olson & Trexler
Attys.

United States Patent Office 3,009,987
Patented Nov. 21, 1961

3,009,987
CONNECTOR
Morris Brenner, Erie, Pa., assignor to Penn-Union Electric Corporation, Erie, Pa., a corporation of Pennsylvania
Filed June 23, 1959, Ser. No. 822,265
4 Claims. (Cl. 174—94)

The present invention relates to a novel electrical connector, and more specifically to a novel compression-type connector.

An important object of the present invention is to provide a novel compression-type connector of simple and economical construction and adapted to be readily applied to a pair of wires either at ends or midportions thereof for securely, electrically and mechanically connecting the wires.

Another important object of the present invention is to provide a novel connector which is constructed so that when it is compressed or crimped onto a pair of wires it will be deformed in a manner which reduces any possibility of cracking or injury to the connector and which provides a rugged and secure fastening between the wires.

Other objects and advantages will become apparent from the following description and the accompanying drawings wherein.

Referring now more specifically to tthe drawings wherein like parts are designated by the same numerals throughout the various figures, a connector 10 is shown for joining a tap wire or cable 12 to an intermediate portion of a main line 14. However, it is to be understood that the connector 10 may be used in any installation for connecting a pair of wires or cables and it will become apparent that the connector may be readily applied to intermediate portions of one or both of the wires as well as to end portions of the wires. The connector 10 may be formed from various suitable electricity conducting materials, but if, for example, the wires or cables 12 and 14 are made of aluminum, then tthe connector 10 is preferably formed from aluminum or an alloy thereof.

Figure 1:
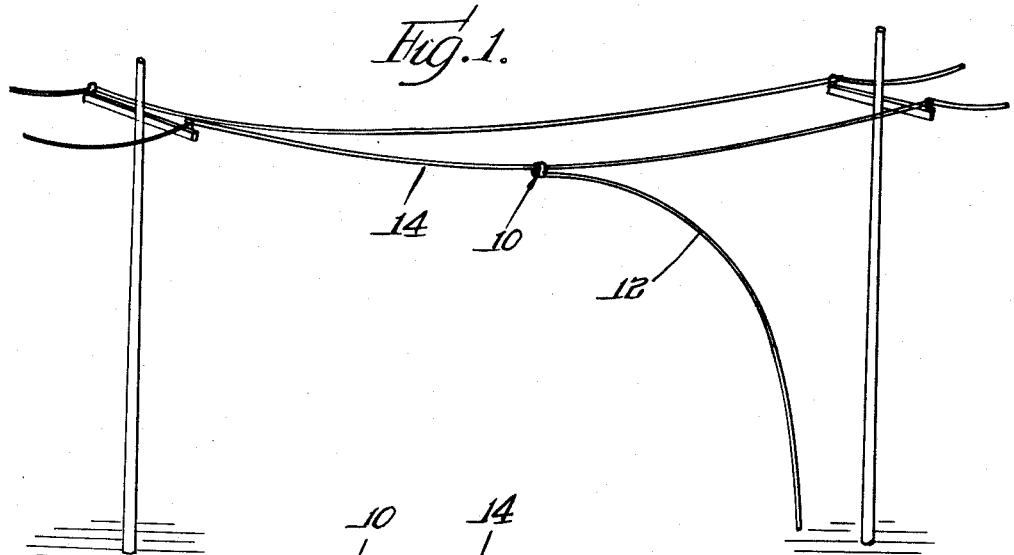
FIG. 1 shows an electrical wire system in which a connector of the type contemplated herein is used.
Figure 2:
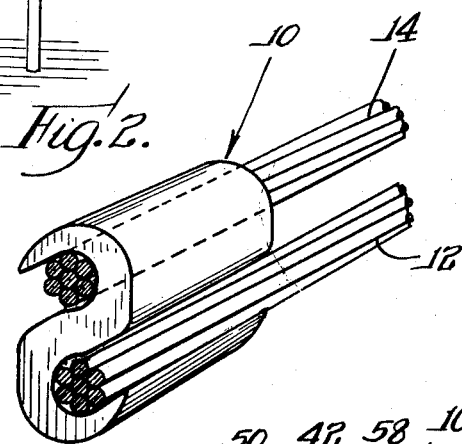
FIG. 2 is a fragmentary perspective view showing a connector incorporating features of the present invention partially assembled with a pair of wires to be connected.
Figure 4:
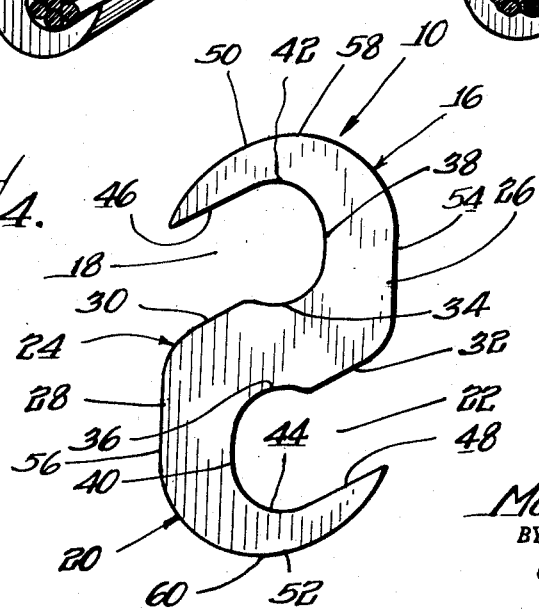
FIG. 4 is an end elevational view of the connector prior to being compressed on the wires.

As shown in FIGS. 2 and 4, the connector 10 is constructed so that it initially has a symmetrical generally S-shaped transverse cross section. More specifically, the connector is provided with a first elongated hook section 16 having a lateral opening 18 through which a wire may pass facing in one direction, and a second or lower hook section 20 having a wire accommodating lateral opening 22 facing generally oppositely from the opening 18. As indicated the width of the openings 18 and 22 is at least as great as the diameter of the wires 12 and 14 so that the connector may be applied to intermediate as well as end portions of the wires. The hook sections 16 and 20 are integrally connected by an intermediate section 24 of the connector which extends, in transverse cross section, diagonally between inner margins 26 and 28 of the hook sections 16 and 20. This arrangement of the intermediate section is important since it facilitates collapsing of the connector onto the wires in the manner described more in detail below.

The intermediate section 24 has opposite substantially straight side surfaces 30 and 32 extending diagonally with respect to the vertical axis of the connector in the manner shown in FIGS. 2 and 4. Inner ends of these surfaces are, however, recessed to provide arcuate seats 34 and 36 respectively, which seats are adapted to accommodate partially the wires for preventing the wires from slipping out through the openings 18 and 22 during compression of the connector. The arcuate seats 34 and 36 respectively merge with curved surfaces 38 and 40, which surfaces 38 and 40 have a curvature with a radius greater than the radius of the wires. The surfaces 38 and 40 which define the inner ends of the lateral openings 18 and 22 in turn merge with arcuate surface portions 42 and 44 disposed in opposing relationship to the seats 34 and 36 and having substantially the same curvature as the seats for accommodating the wires. The outermost but inwardly facing curved surfaces or seats 42 and 44 merge with substantially straight surface portions 46 and 48 defining the inner sides of free marginal portions of the hook sections and also being disposed substantially parallel to the intermediate section surfaces 30 and 32 and combining with these to define sides of the openings 18 and 22. Outer end surfaces 50 and 52 of the hook sections are rounded in the manner shown and merge with substantially straight outer side surfaces 54 and 56 which extend to the intermediate diagonal section. It will be noted that the transverse thickness of the hooked sections progressively increases from their outer free margins to their inner margins 26 and 28 or the junctions with the intermediate diagonal section 24, which last mentioned section has a thickness greater than the thickness of the hook sections. Thus the portions of the connector which are deformed are worked the most while being compressed onto the wires have the greatest thickness for minimizing any possiblity of injury to the connector as a result of the compression thereof.

When applying the connector to the wires, it will be appreciated that the opposite sections 16 and 20 of the connector may be readily hooked around the wires. Then the connector may be easily engaged by means of known compression tools and crimped onto the wires. It is to be noted that the symmetrical formation of the connector enables it to be applied to the wires without any special positioning with respect to one wire or the other. Furthermore, presently available crimping tools and dies may be used for compressing the connector.

Figure 3:
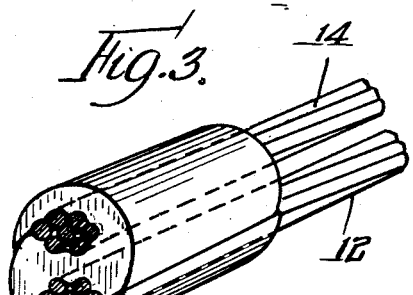
FIG. 3 is a perspective view similar to FIG. 2 but shows the connector fully compressed on the wires.

The crimping dies which are not shown preferably are complementary to the curved outer end surfaces 50 and 52 of the connector so that during the compressing or crimping action, there is a minimum amount of bending and cold working of the relatively thin outer marginal portions of the hook sections. Furthermore, the centers of the arcuate seats 34 and 42 are offset from the high point 58 of the outer end surface 50 in a direction away from the closed end of the lateral opening 18, and the centers of the other pair of opposed seats 36 and 44 are offset from the high point 60 of the outer end surface 52 in a direction away from the closed end surface 40 of the opening 22. As a result, major portions of the opposed crimping forces during a compressing operation, are directed through the inner marginal portions of the hook sections to opposite ends of the diagonal intermediate section so as to cause compression and foreshortening of the inner marginal portions of the hook sections and deflection of the diagonal intermediate section 24 toward a position more nearly perpendicular to the vertical axis of the connector as shown in FIG. 3. This action causes the wires to be aggressively clamped between and even partially embedded in the opposing pairs of seats or surfaces 34–42 and 36–44. Thus an effective electrical and mechanical connection is obtained between the connector and the wires. It will further be noted that the offset arrangement of the seats with respect to the high points of the outer surfaces described above results in the seats 34–42 being offset from the seats 36–44 so that during the compressing action, the wires are slightly offset from each other whereby forming of the intermediate section around the wires is facilitated. When the connector is fully compressed as shown in FIG. 3, there is a slight flattening of the transverse cross section of the cables or wires for further promoting a secure mechanical connection, and in addition, the surfaces 46 and 48 of the hook section free marginal portions overlap and substantially abut outer ends of the surfaces 30 and 32 respectively of the intermediate section for closing the mouths of the lateral openings 18 and 22 and, more specifically, for completely enclosing the wires so as to minimize any possibility of loosening of the wires as a result of cold flow or creep.

While the preferred embodiment of the present invention has been shown and described herein, it is obvious that many structural details may be changed without departing from the spirit and scope of the appended claims.

The invention is claimed as follows:

1. A one-piece connector of the type described comprising a first section having a hook-shaped transverse cross section with a lateral opening facing in one direction for receiving a first wire, a second section having a hook-shaped transverse cross section with a lateral opening facing in an opposite direction for receiving a second wire, and an intermediate section extending diagonally between and integrally joining inner margins of said first and second sections, said intermediate diagonal section being collapsed for closing said openings and retaining the wires when the connector is compressed on the wires, said intermediate section having opposite side surfaces also extending diagonally between said inner margins and respectively including recessed wire accommodating seat means at inner ends thereof for resisting accidental passage of the wires out of said openings during a connector compressing operation, said intermediate section opposite side surfaces being substantially parallel to each other, and said first and second sections including outer free marginal portions having inner surfaces generally parallel to and substantially at least coextensive with said intermediate section surfaces.

2. A connector, as defined in claim 1, wherein said first and second sections progressively increase in thickness from outer free margins thereof substantially to said inner margins thereof, and said intermediate diagonal section has a thickness at least substantially as great as the thickness of said first and second sections at said inner margins.

3. A connector of the type described comprising a body member having a generally S-shaped transverse cross section and including first and second oppositely disposed hook sections having oppositely facing lateral openings for accommodating first and second wires, and a diagonally extending intermediate section disposed between and integrally joining inner margins of said first and second hook sections, said intermediate section including opposite side surfaces extending diagonally with respect to a plane substantially bisecting both of said hook sections and respectively defining sides of said openings and respectively including recess means along inner edges thereof providing arcuate wire accommodating seats, said first and second hook sections respectively including inwardly facing arcuate wire accommodating seats paired with and opposing the seats in the opposite side surfaces of said intermediate section, the opposed seats of each of said pairs having a predetermined maximum spacing greater than the diameter of a wire to be assembled with the connector, outer free marginal portions of said hook sections including inner surfaces substantially parallel to and at least substantially coextensive with said side surfaces of said intermediate section and combining with said side surfaces in defining mouths of said openings having a width less than said spacing, said hook sections and said intermediate section having substantially continuous uninterrupted exterior surfaces.

4. A connector, as defined in claim 3, wherein said hook sections having relatively thin outer free margins and inner margins of substantially increased thickness, said intermediate section having a thickness at least substantially as great as the thickness of said hook sections at their inner margins, said hook sections having rounded outer end surfaces for accommodating complementary crimping dies and having high points offset from said pairs of seats toward their respective inner margins for facilitating collapsing of inner marginal portions of the hook sections and forming of the intermediate section during a connector compressing operation for closing the mouths of said openings and aggressively clamping the wires between said pairs of seats.

References Cited in the file of this patent

UNITED STATES PATENTS

| | | |
|---|---|---|
| 535,592 | Lillie | Mar. 12, 1895 |
| 1,692,218 | McIntosh | Nov. 20, 1928 |
| 1,858,284 | Schwartz | May 17, 1932 |
| 2,884,478 | Becker et al. | Apr. 28, 1959 |
| 2,938,069 | Toedtman et al. | May 24, 1960 |

FOREIGN PATENTS

| | | |
|---|---|---|
| 132,599 | Great Britain | Sept. 16, 1919 |
| 512,689 | Canada | May 10, 1955 |